July 16, 1963  J. K. KERVER  3,097,694
HYDRAULIC FRACTURING PROCESS
Filed April 29, 1959

INVENTOR.
JOHN K. KERVER,
BY
ATTORNEY

3,097,694
HYDRAULIC FRACTURING PROCESS
John K. Kerver, Houston, Tex., assignor, by mesne assignments, to Jersey Production Research Company, Tulsa, Okla., a corporation of Delaware
Filed Apr. 29, 1959, Ser. No. 809,841
8 Claims. (Cl. 166—42)

The invention generally concerns hydraulic fracturing operations. More particularly, the invention concerns a process for retaining fracturing sand in place following hydraulic fracturing of a subsurface formation.

When oil and gas subsurface reservoirs are hydraulically fractured to increase productivity, propping agents, such as loose sand or gravel, are employed to prop the fractures open once they have formed. However, often after fracturing a reservoir with fluid mixtures containing a propping agent difficulty is experienced because much of this loose propping agent is produced back out of the fracture and into the well. This is undesirable because the propping agent is no longer in place to hold the fracture open and the bulk of the propping agent is produced into the well which causes accumulation of the agent in the well bore (sand-out) or movement of the agent to the surface with consequent interference with tubings and other equipment.

To overcome this disadvantage in hydraulic fracturing, the method of the invention provides for fracturing the subsurface reservoir with a fracturing fluid containing a propping agent and consolidating the propping agent at the same time in order to maintain the fractures open. The sand or gravel propping agent has a preferred screen size in the range from about 6 to 300 mesh.

Therefore, a primary object of the present invention is to provide a hydraulic fracturing technique especially adapted to retain a propping agent employed in the fracturing operation in place.

This and other objects and advantages of the invention will be apparent from a more detailed description of the invention taken in conjunction with the drawings wherein.

Figure 1:
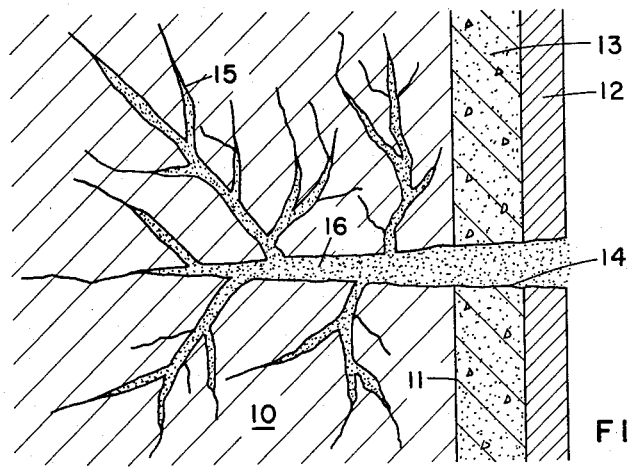
FIG. 1 is a cross-sectional view of a portion of a well bore and illustrates a fractured formation with the treated sand of the invention in the fractures.
Figure 2:
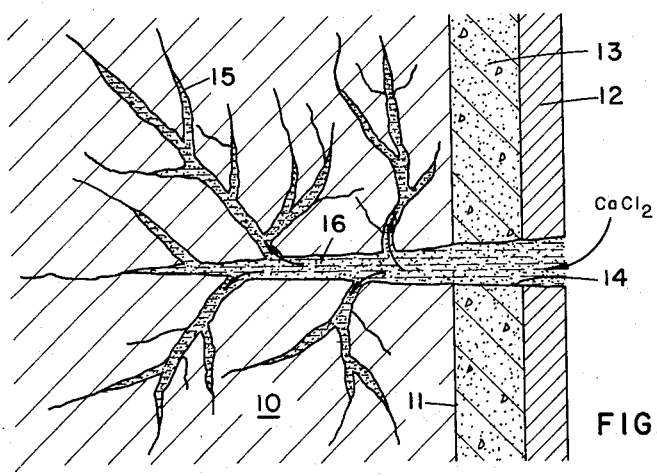
FIG. 2 is a view similar to that of FIG. 1 and illustrates over-flushing the treated sand with a coagulating fluid.
Figure 3:
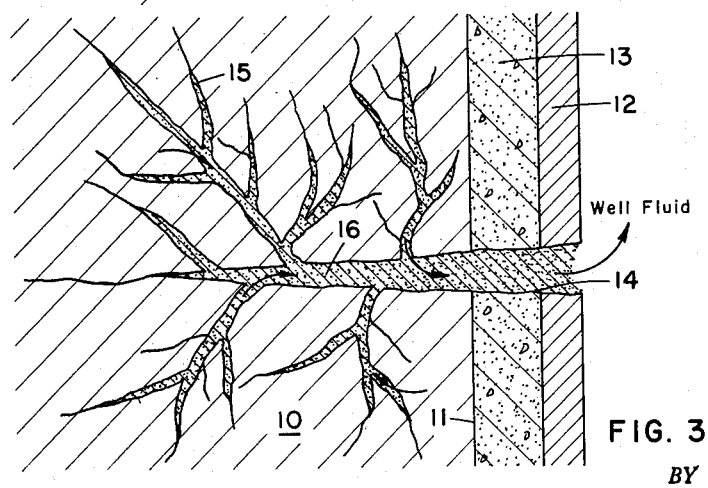
FIG. 3 is another view similar to that of FIG. 1 and illustrates production of well fluids from the fractured formation through the consolidated sand.

In FIGS. 1 to 3 is shown a subsurface formation 10 penetrated by a borehole 11. A casing 12 extends through borehole 11 and is cemented therein by means of cement 13. Formation 10, cement 13, and casing 12 have been perforated, as indicated by perforation 14, by any suitable means such as by a conventional jet-type or bullet-type gun perforator. Hydraulic fracturing liquid is then pumped into casing 12 and according to conventional procedure sufficient pressure is applied to the fracturing liquid column to force the liquid through perforations 14 to form fractures 15 in formation 10. The fracturing liquid contains a propping agent 16 such as sand or gravel which acts to prop open the fractures formed in formation 10 to assist in maintaining channels of flow after the formation has been fractured and to retain formation sands. The fracturing liquid is preferably a low viscosity liquid. For example, crude oil may be employed alone as the fracturing liquid or a bodying agent may be added thereto. The bodying agent may comprise, for example, colloid materials, a metallic soap of an organic acid, a high molecular weight oil-soluble polyolefin, such as polypropylene, or a plastering agent, such as blown asphalt, pitch, or the like. Also, the fracturing material may be in the form of a gel rather than a liquid. Suitable gels are, for example, a mixture of heavy metal soaps and hydrocarbons, such as fuel oil, crude oil, and lighter fractions of crude petroleum. Further, suitable organic compounds of the plastic group which have the property of reverting to a non-viscous condition with the passage of time, or through the action of certain chemicals, or through appropriate changes in temperature or pressure are suitable as the fracturing liquid containing the propping agent.

In the preferred embodiment of the invention, illustrated in FIGS. 1 to 3, to a dry fracturing propping agent about 3 to 15 percent by volume of concentrated viscous sodium silicate is added. Other water soluble silicates, such as sodium metal silicate, sodium hexasilicate, and potassium silicate, may be used instead of sodium silicate. If desired, to aid in the subsequent dispersion of the propping agent in the fracturing liquid, a foaming agent or interfacial tension reducer, such as, for example, an alkyl aryl sulfonate, a polyoxyethylene stearate, a quaternary ammonium alkyl compound, a polyoxyethylene sorbitan monolaurate, etc. may be incorporated in the silicate. Then, the treated propping agent is added to the fracturing liquid and the formation is fractured as described supra. Following fracture of the formation with the treated sand mixed with the fracturing liquid, the fracturing liquid is circulated out of the well bore and is replaced with a coagulating fluid (see FIG. 2) which is used to overflush the fractured formation 10. Suitable coagulating fluids are solutions of metal salts such as calcium chloride, magnesium chloride, zinc chloride, and copper sulfate or mineral acids such as phosphoric acid, or acid anhydrides such as acetic anhydride or other compounds which form an insoluble reaction product with the silicate. Calcium chloride is the preferred coagulating agent and may be used in concentrations from about 3% to saturated solution (about 40%). The calcium chloride coagulating agent reacts with the silicate (e.g., sodium silicate) added to the propping agents to precipitate hard, solid calcium silicate at the surfaces of the propping agents, which cements them together and to the formation. As illustrated in FIG. 3, the treated sand then is consolidated in place and will not back-flow when the reservoir fluids as indicated by the arrows are produced from the reservoir.

The practice of the invention is illustrated by the following experimental procedure: A sand (propping agent) wet with 40° Bé. sodium silicate was dispersed in kerosene. The mixture then was placed in a simulated fracture 1-inch diameter by 3-inches long. The fracture then was flushed with a saturated calcium chloride solution. The resulting sand was firmly bonded together and permeable.

As an alternate procedure, the individual sand grains may be wetted with sodium silicate and then permitted to dry. In the dry state, the sand is more readily handled, mixed, and treated.

Having fully described the nature, objects and operation of my invention, I claim:

1. A method for hydraulically fracturing a subsurface formation penetrated by a well bore to retain in place propping agents used to prop open the fractures comprising the sequential steps of: treating said propping agents with a water-soluble silicate; dispersing said treated propping agents in a liquid to be used to hydraulically fracture said formation; pumping said mixture of fracture liquid and treated propping agents into said well bore and forcing said mixture into said formation under pressure sufficient to cause hydraulic fracturing thereof; and then overflushing said fractured formation with a coagulating agent which reacts with said silicate to precipitate an insoluble silicate reaction product at the surface of the propping agents to cement said propping agents to each other and to said formation.

2. A method as recited in claim 1 wherein said coagulating agent is a calcium chloride solution employed in a range of concentrations of from about 3 to 40%.

3. A method as recited in claim 1 wherein said silicate is sodium silicate.

4. A method as recited in claim 3 including employing said sodium silicate in the range of from about 3 to 15% by volume.

5. A method for hydraulically fracturing a subsurface formation penetrated by a well bore to retain in place propping agents used to prop open the fractures comprising the sequential steps of: treating said propping agents with a water-soluble silicate; allowing the treated propping agents to dry; adding the dried treated propping agents to a liquid to be used to hydraulically fracture said formation; pumping said mixture of fracture liquid and treated propping agents into said well bore and forcing said mixture into said formation under pressure sufficient to cause hydraulic fracturing thereof; and then overflushing said fractured formation with a coagulating agent which reacts with said silicate to precipitate an insoluble silicate reaction product at the surface of the propping agents to cement said propping agents to each other and to said formation.

6. A method as recited in claim 5 wherein said coagulating agent is a calcium chloride solution employed in a range of concentrations of from about 3 to 40%.

7. A method as recited in claim 5 wherein said silicate is sodium silicate.

8. A method as recited in claim 7 including employing concentrated viscous sodium silicate in the range of from about 3 to 15% by volume.

References Cited in the file of this patent

UNITED STATES PATENTS

| 2,131,338 | Vail | Sept. 27, 1938 |
| 2,176,266 | Malmberg | Oct. 17, 1939 |
| 2,198,120 | Lerch et al. | Apr. 23, 1940 |
| 2,365,039 | Andresen | Dec. 12, 1944 |
| 2,681,704 | Menaul | June 22, 1954 |
| 2,823,753 | Henderson et al. | Feb. 18, 1958 |
| 2,859,819 | Trott | Nov. 11, 1958 |
| 2,888,988 | Clark | June 2, 1959 |
| 2,981,334 | Powell | Apr. 25, 1961 |
| 2,986,538 | Nesbitt et al. | May 30, 1961 |

FOREIGN PATENTS

| 201,013 | Austria | Dec. 10, 1958 |